(12) United States Patent
Lin et al.

(10) Patent No.: US 9,229,302 B2
(45) Date of Patent: Jan. 5, 2016

(54) PROJECTOR HAVING HEAT DISSIPATION ELEMENT DISPOSED ON A CASE WITH OPTICAL ELEMENTS THEREIN

(75) Inventors: Chia-Jui Lin, Taoyuan Hsien (TW); Hsiu-Ming Chang, Taoyuan Hsien (TW); Mao-Shan Hsu, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 510 days.

(21) Appl. No.: 13/313,212

(22) Filed: Dec. 7, 2011

(65) Prior Publication Data
US 2012/0182530 A1    Jul. 19, 2012

(30) Foreign Application Priority Data

Jan. 14, 2011   (TW) .............................. 100101370 A

(51) Int. Cl.
*G03B 21/16*   (2006.01)
*H04N 9/31*    (2006.01)

(52) U.S. Cl.
CPC .............. *G03B 21/16* (2013.01); *H04N 9/3144* (2013.01)

(58) Field of Classification Search
CPC ................ G03B 21/16; H04N 9/3144; G02F 1/133382; G02F 1/133385
USPC ........... 353/52, 57–58, 60–61; 362/264, 294, 362/373; 349/161
See application file for complete search history.

(56) References Cited

U.S. PATENT DOCUMENTS

| | | | | |
|---|---|---|---|---|
| 5,676,442 A * | 10/1997 | Fujimori | ........................ | 353/119 |
| 6,428,170 B1 | 8/2002 | Haba | | |
| 6,488,380 B1 * | 12/2002 | Fujimori | ........................ | 353/119 |
| 6,793,346 B2 * | 9/2004 | Nakano et al. | ................ | 353/119 |
| 7,077,526 B2 * | 7/2006 | Overmann et al. | ............. | 353/52 |
| 8,007,114 B2 | 8/2011 | Chen | | |
| 8,256,901 B2 * | 9/2012 | Lim et al. | ......................... | 353/60 |
| 2002/0176054 A1 * | 11/2002 | Mihalakis | ........................ | 353/31 |
| 2005/0012905 A1 * | 1/2005 | Morinaga | ........................ | 353/58 |

(Continued)

FOREIGN PATENT DOCUMENTS

| | | |
|---|---|---|
| CN | 101135836 A | 3/2008 |
| CN | 101650517 A | 2/2010 |

(Continued)

OTHER PUBLICATIONS

Office Action for the Taiwainese patent application No. 100101370 dated Sep. 12, 2013. Partial English translation attached.

(Continued)

*Primary Examiner* — Jori S Reilly-Diakun
(74) *Attorney, Agent, or Firm* — Cantor Colburn LLP

(57) ABSTRACT

The projection apparatus includes a light source, optical elements and a heat dissipation assembly. The heat dissipation assembly includes a case, a heat dissipation element, a fan and a temperature controlling unit. The optical elements transmit a light beam generated by the light source, and thereby generate heat. The heat dissipation assembly is adapted for heat dissipation correspondingly. In the heat dissipation assembly, the case protects the optical elements from being polluted by the dust during heat dissipation. The temperature controlling unit senses the surrounding temperature to control the fan for cooling the heat dissipation element, and the durability of the optical elements are thereby enhanced.

14 Claims, 4 Drawing Sheets

(56) References Cited

U.S. PATENT DOCUMENTS

| | | | |
|---|---|---|---|
| 2007/0258057 A1* | 11/2007 | Hsu et al. | 353/84 |
| 2009/0086171 A1 | 4/2009 | Sun | |
| 2010/0053567 A1* | 3/2010 | Lian et al. | 353/61 |
| 2011/0019161 A1* | 1/2011 | Chen et al. | 353/61 |
| 2012/0081617 A1* | 4/2012 | Cho | 348/748 |
| 2012/0327316 A1* | 12/2012 | Okada et al. | 348/748 |

FOREIGN PATENT DOCUMENTS

| | | |
|---|---|---|
| CN | 101820737 A | 9/2010 |
| JP | 2005173019 A | 6/2005 |
| TW | 200638764 A | 11/2006 |
| TW | I267608 B | 12/2006 |
| TW | 200705084 A | 2/2007 |

OTHER PUBLICATIONS

Office Action for the Chinese patent application No. 201110041436.1 dated Oct. 8, 2013. Partial English translation attached.

Office Action for the Chinese patent application No. 201110041436.1 dated Feb. 24, 2014. Partial English translation attached.

* cited by examiner

PROJECTOR HAVING HEAT DISSIPATION ELEMENT DISPOSED ON A CASE WITH OPTICAL ELEMENTS THEREIN

This application claims the benefit from the priority of Taiwan Patent Application No. 100101370 filed on Jan. 14, 2011, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to a heat dissipation assembly, and in particular, to a heat dissipation assembly for use in a projection apparatus.

2. Descriptions of the Related Art

Because consumers have gravitated towards projection apparatuses with higher definition and more vivid colors, projection apparatuses have had to be designed to keep competitive in the market. Correspondingly, demands on the projection luminance of the projection apparatuses have also increased. However, the increase in luminance inevitably leads to a higher operating temperature of optical elements, which transmit light rays in the projection apparatuses.

More specifically, due to the residual energy remaining in the light transmission process, heat accumulates among the optical elements and leads to a temperature rise in the whole projection apparatus. An excessively high temperature would adversely affect the light transmission and reduce the service life of the optical elements, so a heat dissipation element must be provided for cooling. Accordingly, heat dissipation has become an important problem to be overcome in the development of projection apparatuses.

A conventional way to dissipate heat is to open a hole on the case of a projection apparatus and to dispose a fan in the hole. Then when the fan operates, an air flow would be driven from outside and flow into the projection apparatus to cool the optical elements in the projection apparatus. However, despite having the optical elements directly exposed to the air outside the apparatus to help in the cooling process, dust from the surroundings may be brought into the inner elements with the airflow. Consequently, the efficiency of the optical elements in transmitting the light rays might be degraded and cause a decrease in the projection luminance. In some circumstances, the optical elements might even be damaged.

Accordingly, an urgent need exists in the art to provide a heat dissipation assembly that is not susceptible to pollutants in the air and, meanwhile, improve the luminance of the projection apparatus through heat dissipation to provide consumers with better visual experiences and to improve the stability and prolong the service life of the optical elements in the projection apparatus.

SUMMARY OF THE INVENTION

An objective of the present invention is to provide a heat dissipation assembly that can effectively prevent pollutants from the surrounding air from entering the heat dissipation assembly, while also improving the luminance and dissipating heat.

To achieve the aforesaid objective, the present invention provides a heat dissipation assembly disposed within a projection apparatus. The projection apparatus comprises a light source, a plurality of optical elements and the heat dissipation assembly. The light source is adapted to generate a light beam, the plurality of optical elements are adapted to transmit the light beam, and the heat dissipation assembly is adapted to dissipate heat from the optical elements.

The heat dissipation assembly comprises a case, a heat dissipation element, a first fan and a temperature controlling unit. The case is adapted to receive at least one of the optical elements of the projection apparatus; the heat dissipation element is disposed on a surface of the case; the first fan is disposed outside the case; and the temperature controlling unit is electrically connected to the first fan and comprises a temperature sensor for sensing the temperature around the temperature sensor.

When the projection apparatus operates, heat is accumulated among the optical elements due to transmission of the light beam. The heat is transmitted to the heat dissipation element by heat convection or heat transfer, and is then dissipated outwards through the heat dissipation element. Meanwhile, the temperature controlling unit senses a surrounding temperature and controls the fan to develop a cooling air flow according to the control unit to lower the temperature and increase the heat exchange speed between the heat dissipation element and the outside.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a heat dissipation assembly and a projection apparatus with the same. In the following descriptions, the present invention will be explained with reference to the embodiments thereof. However, it should be appreciated that the following descriptions of these embodiments are only intended to illustrate but not to limit the present invention. Meanwhile, in the following embodiments and the attached drawings, elements unrelated to the present invention are omitted from depiction; and dimensional relationships among individual elements in the attached drawings are illustrated only for ease of understanding, but not to limit the actual scale.

Figure 1:
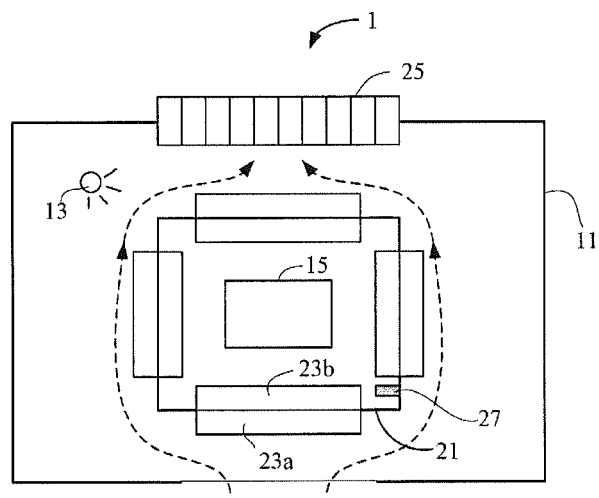
FIG. 1 is a schematic view of a projection apparatus according to a first embodiment of the present invention.

The first embodiment of the present invention is a projection apparatus 1, a schematic view of which is shown in FIG. 1. The projection apparatus 1 comprises a housing 11, a light source 13, an optical element set 15 and a heat dissipation assembly. The housing 11 is adapted to receive and protect components inside the projection apparatus 1 (i.e., the light source 13 and the optical element set 15 in this embodiment). The light source 13 is adapted to generate a light beam. The optical element set 15 comprises a plurality of optical elements adapted to transmit the light beam and convert the light beam into images for projection outwards.

As shown in FIG. 1, the heat dissipation assembly comprises a case 21, a heat dissipation element, a first fan 25 and a temperature controlling unit 27. The case 21 is adapted to sealingly encapsulate the optical element set 15 therein to protect all optical elements of the optical element set 15 from ambient pollution. In this embodiment, the case 21 is preferably formed integrally, and the light source 13 is preferably disposed between the housing 11 and the case 21. Additionally, in practical application, foam may be disposed at the welding, where the case 21 is closed to improve the sealing capability of the case from dust entry.

The heat dissipation element comprises four first cooling fins 23a and four second cooling fins 23b. The first cooling fins 23a are disposed on four sides of an outer surface of the case 21 respectively; while the second cooling fins 23b are disposed on four sides of an inner surface of the case 21. The second cooling fins 23b are disposed corresponding to the first cooling fins 23a respectively. The second cooling fins 23b are adapted to transfer heat generated from the optical element set 15 to the first cooling fins 23a, and thus be dissipated outwards. In this embodiment, the cooling fins 23a, 23b are formed integrally with the case 21 as shown in FIG. 1 to make the heat transfer process smoother, although the present invention is not limited thereto. Preferably, the case 21 of the present invention is made of a metal, while the first cooling fins and the second cooling fins are made of aluminum (Al) or copper (Cu).

The first fan 25 is disposed outside the case 21, and more specifically, the first fan 25 in this embodiment is disposed at an interior edge of the housing 11. When the first fan 25 operates, air flow (as shown by the dashed lines with arrows) inside the housing 11 can be effected to enhance the heat dissipation efficiency. The number and locations of the first fans 25 of the present invention are not limited to what is described in this embodiment, but may be modified by those skilled in the art depending on the practical heat dissipation requirements.

The temperature controlling unit 27 comprises a temperature sensor (not shown) disposed on an inner surface of the case 21 and electrically connected to the first fan 25. In response to the temperature condition retrieved by the temperature sensor, the temperature controlling unit 27 produces a controlling signal to the first fan 25 to generate an air flow or further adjusts a rotation speed of the first fan 25 to change the velocity of the air flow. A faster air flow could increase the efficiency of the heat dissipating. Through the air flow generated by the first fan 25, the heat accumulated in the optical element set 15 due to the transmission of the light beam can be dissipated by the heat dissipation element to the outside of the case 21.

Figure 2:
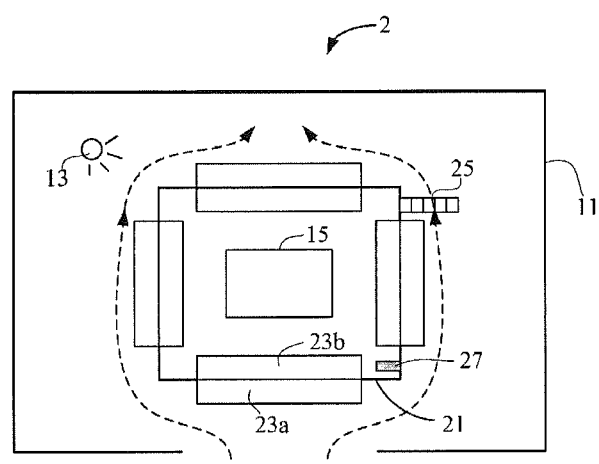
FIG. 2 is a schematic view of a projection apparatus according to a second embodiment of the present invention.

FIG. 2 illustrates a schematic view of a projection apparatus 2 according to the second embodiment of the present invention. The projection apparatus 2 of this embodiment is similar to the projection apparatus 1 of the first embodiment, and the main difference there between is that the first fan 25 of the heat dissipation assembly of the second embodiment is disposed near the outer surface of the case 21, so that the heat dissipating efficiency of the wall surfaces and the first cooling fins 23a is enhanced. In other embodiments, the manner in which the first fan disposed in the first embodiment and that in the second embodiment may be used in combination by those skilled in the art, i.e., the first fan is provided on the surface of each of the housing 11 and the case 12, and this can further improve the overall heat dissipation efficiency of the projection apparatus.

Figure 3:
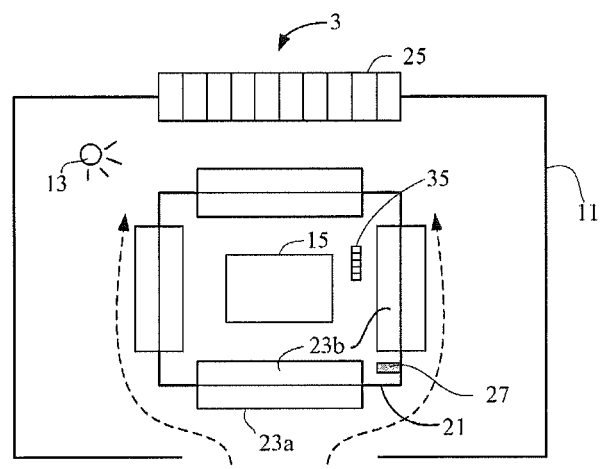
FIG. 3 is a schematic view of a projection apparatus according to a third embodiment of the present invention.

A projection apparatus 3 according to the third embodiment of the present invention is shown in FIG. 3. The projection apparatus 3 is also similar to the projection apparatus 1 of the first embodiment, but further comprises a second fan 35. The second fan 35 is disposed inside the case 21 to uniform the air temperature inside the case 21 more quickly. This helps to decrease the hotspot temperature of the optical elements and enhance the heat dissipation efficiency of the second cooling fins 23b. Similarly, the number of second fans to be used in other embodiments is not limited, but may be altered depending on the heat dissipation requirements; and furthermore, the first fan(s) and the second fan(s) may also be used in the same projection apparatus simultaneously and the numbers thereof are not limited.

Preferably, depending on the heat dissipation requirements, the heat dissipation assembly may also comprise a plurality of temperature controlling units; the temperature controlling units may be electrically connected to some or all of the fans. Here, the fans may include the first fan(s) 25 and the second fan(s) 35.

Figure 4:
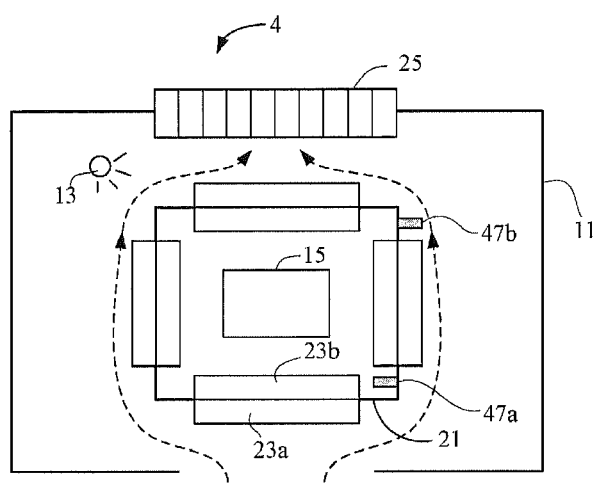
FIG. 4 is a schematic view of a projection apparatus according to a fourth embodiment of the present invention.

A projection apparatus 4 according to the fourth embodiment of the present invention is shown in FIG. 4. The projection apparatus 4 of this embodiment is also similar to the projection apparatus 1 of the first embodiment except that the heat dissipation assembly of the fourth embodiment comprises two temperature controlling units 47a, 47b disposed on the inner surface and the outer surface of the case 21 respectively. Similarly, the temperature controlling units 47a, 47b are also both electrically connected to the first fan 25 and each comprises a temperature sensor for sensing temperatures inside and outside the case 21 respectively. In response to the temperature, signals are produces from the temperature controlling units 47a, 47b to the first fan 25 to generate an air flow for cooling purposes. In projection apparatuses of other embodiments, the number of temperature controlling units comprised in the heat dissipation assembly may be altered depending on the heat dissipation requirements; the temperature controlling units may be electrically connected to some or all of the fans. The number and locations of the fans are not limited.

Figure 5:
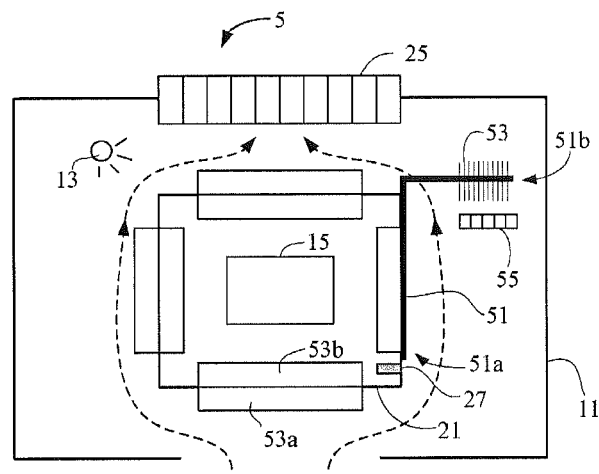
FIG. 5 is a schematic view of a projection apparatus according to a fifth embodiment of the present invention.

FIG. 5 illustrates a schematic view of a projection apparatus according to the fifth embodiment of the present invention. In addition to the case 21, the heat dissipation element, the first fan 25 and the temperature controlling unit 27, the heat dissipation assembly of this embodiment further comprises a heat pipe 51, a third cooling fin 53 and a third fan 55. Furthermore, the heat dissipation element of the heat dissipation assembly comprises three first cooling fins 53a and four second cooling fins 53b.

The heat pipe 51 has an attachment end 51a and a far end 51b. The attachment end 51a is closely attached to the outer surface of the case 21, while the far end 51b is not attached to the case 21 but extends away from the case 21. The third cooling fin 53 is disposed on the far end 51b, and a cooling air flow generated by the third fan 55 carries the heat away from the third cooling fin 53. Thereby, the heat pipe 51 attached to the case 21 can effectively reduce the heat around the case 21 by effectively absorbing the heat from the case 21. The heat that is carried away from the case 21 could be dissipated by the third cooling fin 53 through the air flow generated by the third fan 55.

Figure 6:
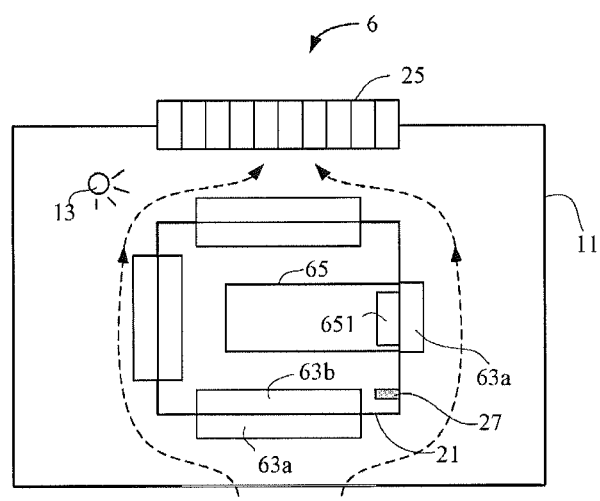
FIG. 6 is a schematic view of a projection apparatus according to a sixth embodiment of the present invention.
Figure 7:
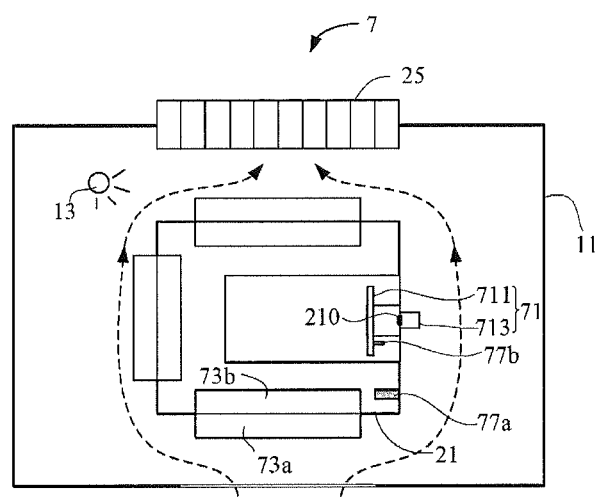
FIG. 7 is a schematic view of a projection apparatus according to a seventh embodiment of the present invention.

In reference to FIGS. 6 and 7, the heat dissipation assembly of the present invention may also be designed particularly for at least one optical element of the optical element set. A projection apparatus 6 according to the sixth embodiment of the present invention is shown in FIG. 6. The projection apparatus 6 of this embodiment comprises a housing 11, a light source 13, an optical element set 65 and a heat dissipation assembly. The heat dissipation assembly comprises a case 21, a heat dissipation element, a first fan 25 and a temperature controlling unit 27.

The optical element set 65 of this embodiment comprises an optical element 651, which abuts the inner surface of the case 21 and cooperates with the case 21 to substantially define an enclosed space. The heat dissipation element comprises four first cooling fins 63a and three second cooling fins 63b. One of the first cooling fins 63a is disposed corresponding to the optical element 651 to cool down the optical element 651. In this embodiment, the optical element 651 may be a mirror or a lens, although it is not merely limited thereto.

FIG. 7 illustrates a schematic view of a projection apparatus 7 according to the seventh embodiment of the present invention. Similar to the sixth embodiment, the heat dissipation assembly of the projection apparatus 7 comprises a case 21, a heat dissipation element, a first fan 25, two temperature controlling units 77a, 77b and a driving element 713. The case 21 comprises an periphery edge (not shown) that defines a through hole 210, while the heat dissipation element comprises four first cooling fins 73a and three second cooling fins 73b.

In this embodiment, the optical element of the projection apparatus 7 is a color wheel 71 comprising an index board. The color wheel 71 is disposed corresponding to the through hole 210 and abuts on the inner surface of the case 21. The driving element 713 connects to a sensing board 711 through the through hole 210. A temperature controlling element 77a is also disposed on the inner surface of the case 21 and a temperature controlling element 77b is disposed on an inactive surface of the sensing board 711 to sense both the temperature inside the case 21 and the temperature around the sensing board 711 and to generate control signals correspondingly. The control signals are adapted to adjust the rotational speed or turn-on/off of the first fan 25 to improve the heat dissipation efficiency and reduce the energy loss. Preferably, a sealing component (e.g., a foam) is interposed between the driving element 713 and the periphery edge of the through hole 210 to enhance the sealing performance of the case 21.

According to the above descriptions, as compared to the heat dissipation design adopted in conventional projection apparatuses, the heat dissipation assembly of the present invention provides a solution that can effectively dissipate heat in an enclosed space, improve the luminance of the projection apparatus, and can protect the internal optical elements against dust and pollutants from outside the case, thus prolonging the service life and enhance the performance of the projection apparatus.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A heat dissipation assembly within a projection apparatus, the projection apparatus comprising a light source and a plurality of optical elements, wherein the light source generates a light beam, the plurality of optical elements transmit the light beam, and the heat dissipation assembly comprises:
   a case for receiving the optical elements;
   a heat dissipation element, being disposed on a surface of the case, the heat dissipation element comprising at least one first cooling fin and at least one second cooling fin;
   a first fan, being disposed out of the case; and
   a temperature controlling unit, electrically connecting to the first fan and comprising at least one temperature sensor for sensing a temperature around the at least one temperature sensor, and the temperature controlling unit enabling the first fan to generate an air flow in response to the temperature;
   wherein the surface of the case comprises an inner surface and an outer surface, at least one of the plurality of optical elements abuts against the inner surface, and heat generated during transmission of the light beam is accumulated in the at least one of the optical elements and then is dissipated through the heat dissipation element by the air flow generated by the first fan, wherein the at least one first cooling fins is disposed on the outer surfaces of the case, and the at least one second cooling fin and the at least one temperature sensor are disposed on the inner surface of the case.

2. The heat dissipation assembly as claimed in claim 1, wherein the at least one second cooling fin is opposite to the at least one first cooling fin.

3. The heat dissipation assembly as claimed in claim 2, further comprising a heat pipe, disposed on the outer surface of the case and having a far end.

4. The heat dissipation assembly as claimed in claim 3, further comprising a third cooling fin, disposed on the far end.

5. The heat dissipation assembly as claimed in claim 4, further comprising a second fan disposed in the case.

6. The heat dissipation assembly as claimed in claim 5, wherein the case defines an enclosed space.

7. The heat dissipation assembly as claimed in claim 1, wherein the case comprises an interior edge to define a through hole, and the at least one of the plurality of optical elements is disposed corresponding to the through hole and abuts against the inner surface.

8. The heat dissipation assembly as claimed in claim 7, wherein the case and the at least one of the plurality of optical elements, which is disposed corresponding to the through hole and abuts against the inner surface, define an enclosed space.

9. The heat dissipation assembly as claimed in claim 8, wherein the at least one of the plurality of optical elements, which is disposed corresponding to the through hole and abuts against the inner surface, comprises a color wheel, and the projection apparatus further comprises a driving element connecting to the color wheel through the through hole.

10. The heat dissipation assembly as claimed in claim 9, further comprising a sealing component disposed between the driving element and the interior edge.

11. The heat dissipation assembly as claimed in claim 10, wherein the sealing component is made of foam.

12. The heat dissipation assembly as claimed in claim 9, wherein the color wheel further comprises an index board and the at least one temperature sensor is disposed on the index board.

13. The heat dissipation assembly as claimed in claim 6, wherein the case is made of metal.

14. The heat dissipation assembly as claimed in claim 13, wherein the heat dissipation element is formed integrally with the case.

\* \* \* \* \*